United States Patent
Six et al.

(10) Patent No.: US 10,625,302 B2
(45) Date of Patent: Apr. 21, 2020

(54) DYNAMIC IMBALANCED FORCE GENERATOR AND AN ACTUATOR COMPRISING SUCH A GENERATOR

(71) Applicant: HUTCHINSON, Paris (FR)

(72) Inventors: Marc François Six, Corquilleroy (FR); Gérard Tavin, Angers (FR)

(73) Assignee: HUTCHINSON, Paris (FR)

( * ) Notice: Subject to any disclaimer, the term of this patent is extended or adjusted under 35 U.S.C. 154(b) by 57 days.

(21) Appl. No.: 15/789,807

(22) Filed: Oct. 20, 2017

(65) Prior Publication Data
US 2018/0133757 A1    May 17, 2018

(30) Foreign Application Priority Data

Oct. 21, 2016   (FR) ...................... 16 60221

(51) Int. Cl.
| | | |
|---|---|---|
| *B06B 1/16* | (2006.01) | |
| *F16H 55/17* | (2006.01) | |
| *F16F 15/32* | (2006.01) | |
| *B64C 27/00* | (2006.01) | |

(52) U.S. Cl.
CPC .............. *B06B 1/167* (2013.01); *B06B 1/16* (2013.01); *B64C 27/001* (2013.01); *F16F 15/32* (2013.01); *F16H 55/17* (2013.01); *B64C 2027/004* (2013.01); *F16H 2055/173* (2013.01); *F16H 2055/176* (2013.01)

(58) Field of Classification Search
CPC ......... B06B 1/167; B06B 1/16; B64C 27/001; B64C 2027/004; F16F 15/32; F16H 55/17; F16H 2055/173; F16H 2055/176
See application file for complete search history.

(56) References Cited

U.S. PATENT DOCUMENTS

| | | | | |
|---|---|---|---|---|
| 3,415,174 A | * | 12/1968 | Kaltenegger | ......... E01C 19/286 404/117 |
| 3,538,756 A | * | 11/1970 | Coombs | .................... B06B 1/16 310/81 |
| 4,412,757 A | * | 11/1983 | Kummel | ................. E02D 3/074 366/108 |
| 4,561,319 A | | 12/1985 | Lilja | |

(Continued)

FOREIGN PATENT DOCUMENTS

EP     0 409 462 A1    1/1991

OTHER PUBLICATIONS

French Search Report dated Jul. 24, 2017, issued in corresponding French Application No. 1660221, filed Oct. 21, 2016, 2 pages.

*Primary Examiner* — Zakaria Elahmadi
(74) *Attorney, Agent, or Firm* — Christensen O'Connor Johnson Kindness PLLC

(57) ABSTRACT

A dynamic imbalanced force generator includes a pair of eccentric masses and a shaft frame. The generator further includes at least one support plate of a motor arranged radially with respect to the shaft frame, and a gear system. A second imbalance is arranged between a first imbalance and the shaft frame, and coaxially with respect to the first imbalance. At least one motor is supported by the plate and engaged with at least one of the first and second imbalances by the gear system. The support plate and the motor are arranged between the imbalances and the shaft frame.

22 Claims, 6 Drawing Sheets

(56) References Cited

U.S. PATENT DOCUMENTS

| | | | | |
|---|---|---|---|---|
| 4,647,247 A * | 3/1987 | Sandstrom | E01C 19/286 | 172/40 |
| 5,903,077 A * | 5/1999 | Garnjost | B06B 1/166 | 310/81 |
| 6,067,886 A * | 5/2000 | Irwin | B26D 5/14 | 100/282 |
| 6,139,218 A * | 10/2000 | Cochran | B06B 1/16 | 404/113 |
| 7,347,799 B2 * | 3/2008 | Manfredotti | B64C 27/001 | 475/5 |
| 8,894,530 B1 * | 11/2014 | Read | F16H 21/365 | 123/197.4 |
| 9,192,962 B2 * | 11/2015 | Schmidt | B06B 1/166 | |
| 2004/0003671 A1 * | 1/2004 | Fervers | B06B 1/166 | 74/87 |
| 2004/0168531 A1 * | 9/2004 | Mitsui | E01C 19/286 | 74/86 |
| 2010/0034655 A1 * | 2/2010 | Jolly | B64C 27/001 | 416/145 |
| 2011/0027081 A1 * | 2/2011 | Jolly | B64C 27/001 | 416/1 |
| 2011/0209571 A1 * | 9/2011 | Niklewski | B06B 1/162 | 74/87 |
| 2012/0301221 A1 * | 11/2012 | Ackermann | E01C 19/282 | 404/75 |
| 2013/0283941 A1 * | 10/2013 | Burton | B06B 1/161 | 74/87 |
| 2015/0321753 A1 * | 11/2015 | Black | B64C 27/001 | 188/378 |
| 2017/0014867 A1 * | 1/2017 | Smith | B06B 1/162 | |

* cited by examiner

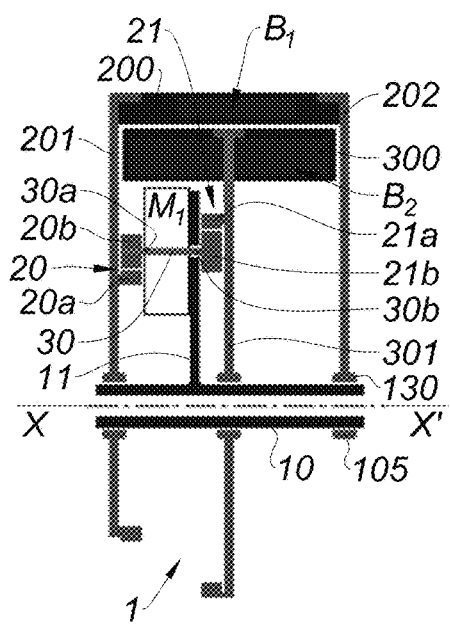
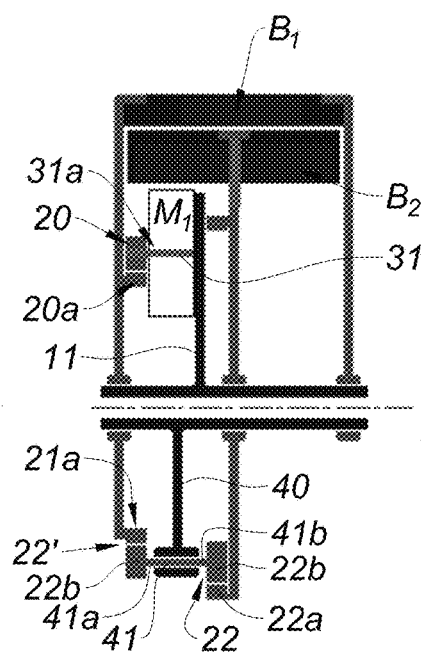
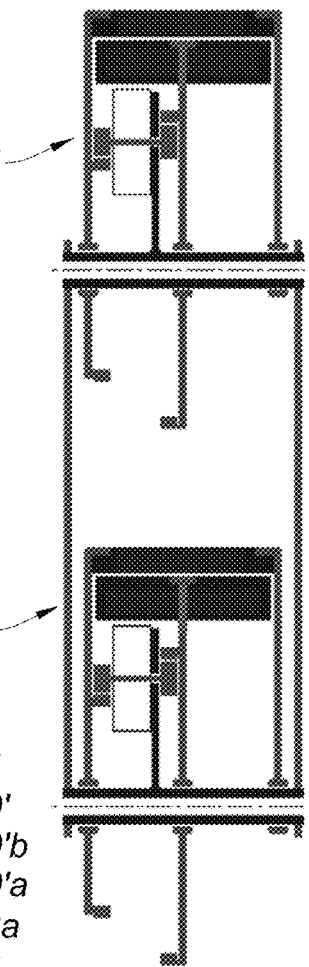
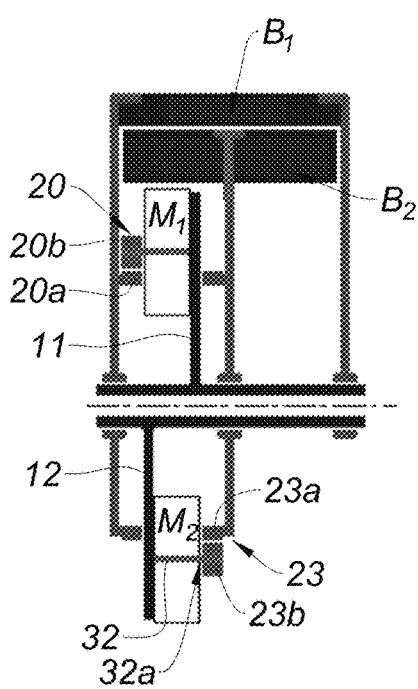
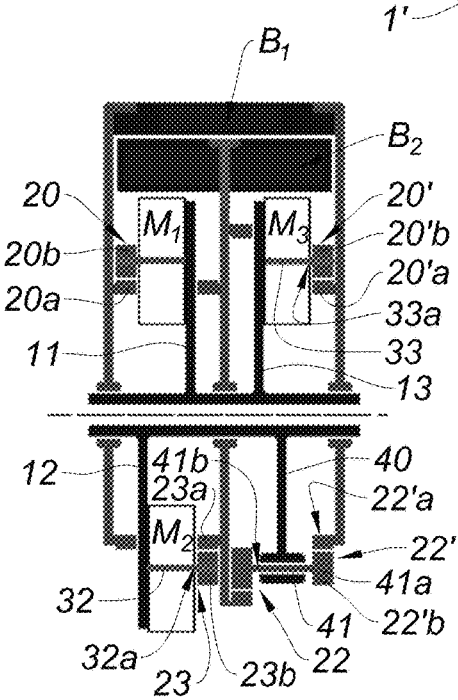
Fig. 1
Fig. 2
Fig. 3
Fig. 4
Fig. 5

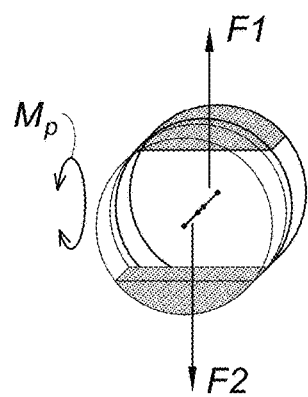
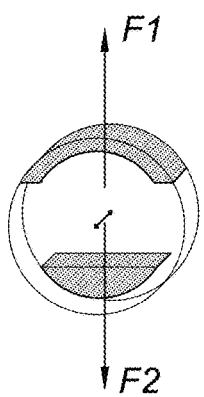
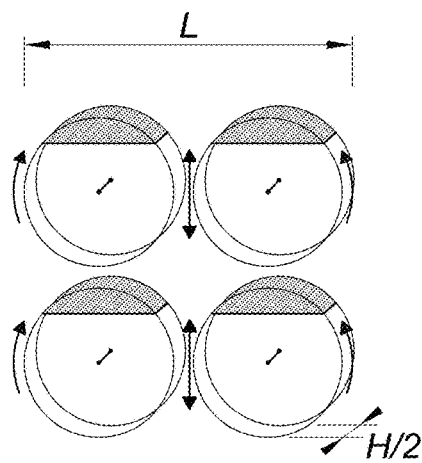
Fig. 19a   Fig. 19b   Fig. 20
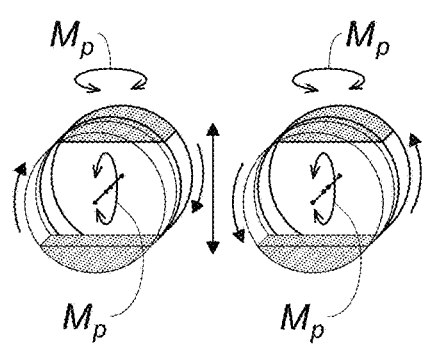
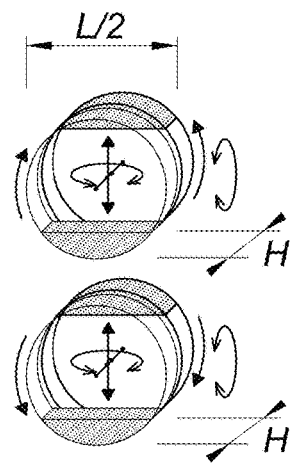
Fig. 21a   Fig. 21b
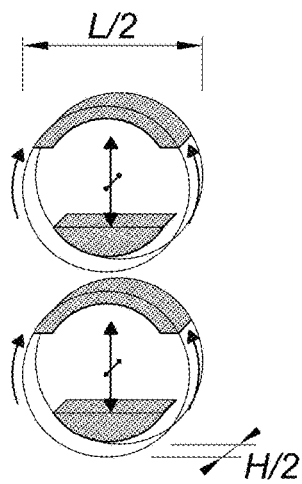
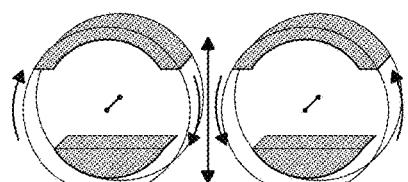
Fig. 22a   Fig. 22b

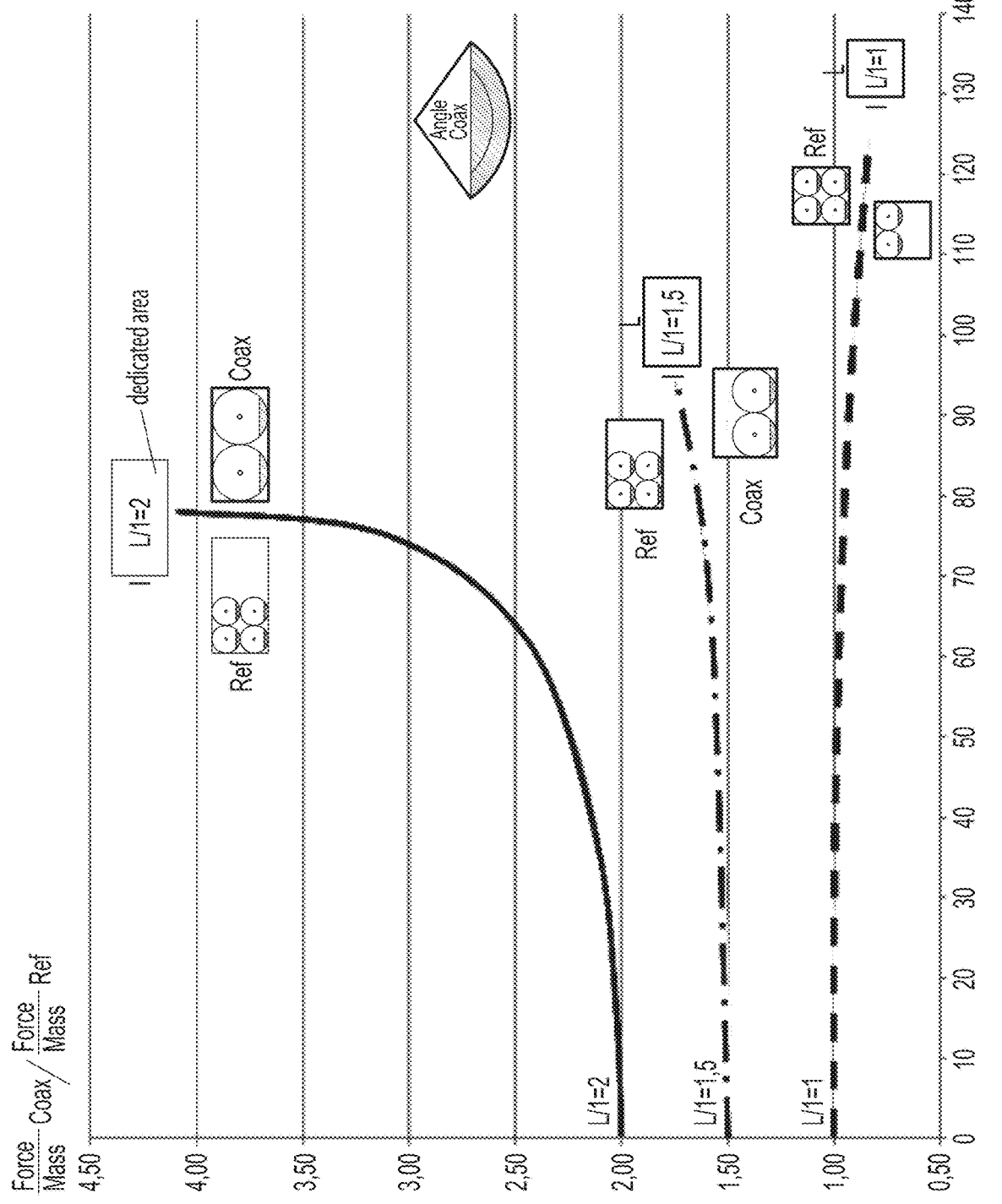

US 10,625,302 B2

DYNAMIC IMBALANCED FORCE GENERATOR AND AN ACTUATOR COMPRISING SUCH A GENERATOR

BACKGROUND

The present disclosure relates to a dynamic imbalanced force generator comprising at least one pair of eccentric mass imbalances and an actuator comprising such a generator.

A dynamic imbalanced force generator comprising a pair of eccentric mass imbalances is known from document FR 2 169 672 (D1).

Also known is a dynamic imbalanced force generator comprising two pairs of eccentric mass imbalances to reduce or even eliminate a vibration generated by a moving body. In this case, the dynamic imbalanced force generator makes it possible to form a variable dynamic imbalanced force generator, also called an actuator. In each pair of imbalances, the two masses of the respective pair rotate in a counter-rotate manner. Implementing two pairs of imbalances then makes it possible to control the amplitude of the delivered dynamic imbalanced force by controlling the phase shift between the two pairs. It is the control of this amplitude, in itself variable, which makes it a real actuator.

An actuator (variable dynamic imbalanced force generator) of this type is described in document U.S. Pat. No. 5,903,077 (D2) in which the eccentric masses are mechanically coupled in pairs. Position sensors are used to achieve the frequency and phase control of these masses. The force generated by the eccentric masses is transmitted via a crankcase supporting the imbalances, which requires that this crankcase has a mass sufficiently large to be sufficiently robust and stiff to be able to transmit the dynamic imbalanced force, and not generate parasitic vibratory modes. Moreover, the mechanical coupling of the counter-rotating eccentric mass imbalances is obtained by external meshing of the two imbalances with parallel axes by means of toothed wheels with a diameter greater than the outside diameter of the imbalances. The volume of the actuator is then greater than the volume of the imbalances themselves, while a large mass not participating in the imbalance effect (the outer toothed ring gear is necessarily balanced and therefore generates no dynamic imbalanced force). Finally, pairs of counter-rotating imbalances are preferably placed one around the other, possibly leading to the introduction of a parasitic vibratory torque into the structure, a torque the amplitude of which is inversely proportional to that of the force generated by the actuator. The actuator thus constituted has a large and non-versatile size.

Another actuator (variable dynamic imbalanced force generator) of this type is described in document EP 2 024 660 (D3). In this document D3, the four eccentric mass imbalances are mechanically independent. This mechanical independence gives freedom in the arrangement of the various imbalances. In particular, in order to reduce the size, the various eccentric masses may be arranged coaxially and side by side. The control of the various imbalances may then be carried out by electronic coupling in order to rotate the imbalances in the desired direction. However, as illustrated in FIG. 19a, this coaxial side-by-side position generates a parasitic torque Mp that is linked to the existence of a non-zero distance along the common axis between the points of application of the forces F1 (the first imbalance of a pair when it rotates) and F2 (the second imbalance of this same pair when it rotates).

Yet another actuator (generator of variable dynamic imbalanced forces) of this type is proposed in document EP 0 409 462 (D4). Here, the four imbalances are also mechanically independent. In order to prevent a parasitic torque from being generated, the imbalances are nested, i.e. the different centers of gravity of each imbalance lie in the same plane, which, in this case, is perpendicular to the coaxial axis of rotation of the various imbalances. On the other hand, its overall size is generally greater than that which is implied by the coaxial and side-by-side arrangement of the various imbalances of document D3. In fact, the overall size is affected by the radial size associated with this nesting and also by the integration of the motors dedicated to each imbalance and located between two imbalances.

The present invention aims to solve at least one of the aforementioned disadvantages.

SUMMARY

This summary is provided to introduce a selection of concepts in a simplified form that are further described below in the Detailed Description. This summary is not intended to identify key features of the claimed subject matter, nor is it intended to be used as an aid in determining the scope of the claimed subject matter.

More particularly, the object of the present invention is a dynamic imbalanced force generator of the type comprising at least one pair of eccentric masses, which has reduced size and weight, and provides comparable effectiveness compared to known solutions.

To this end, the disclosure describes a dynamic imbalanced force generator with imbalances, characterized in that it comprises a shaft frame constructed with a longitudinal axis and further comprising, inter alia:
- at least one support plate of a motor arranged radially with respect to the longitudinal axis of the shaft frame; and
- a gear system,
- wherein the shaft frame carries:
- a first imbalance constituted by an eccentric mass with respect to the shaft frame and rotatably connected to the shaft frame through two arms, one of which is fixed to the gear system;
- a second imbalance constituted by an eccentric mass with respect to the shaft frame rotatably connected to the shaft frame by an arm fixed to the gear system, wherein the second imbalance is arranged between the first imbalance and the shaft frame in a coaxial manner with respect to the first imbalance;
- at least one motor supported by the support plate and linked with at least one of the first and second imbalances by means of the gear system, wherein the support plate and the motor are arranged between the imbalances and the shaft frame, and between an arm of the first imbalance and the arm of the second imbalance.

This dynamic imbalanced force generator may comprise at least one of the following characteristics, taken alone or in combination:
- the shaft frame comprises at least two support plates of a motor arranged radially with respect to the longitudinal axis of the shaft frame and as many motors as there are support plates, wherein each is supported by a support plate and each engages with one of the first and second imbalances via the gear system, wherein at least one first motor engages with one of the first or second imbalances, and at least one second motor engages the other of the first or second imbalances;

the shaft frame comprises two support plates for a motor arranged radially with respect to the longitudinal axis of the shaft frame, wherein each of the first and second motors is supported by a support plate and each is engaged with only one of the first and second imbalances via the gear system; wherein the generator further comprises a control unit adapted to control a counter-rotating rotation of the first and second motors electronically;

the gear system comprises two reduction gears each comprising two toothed wheels of different diameters, one of larger diameter and one of smaller diameter, wherein each toothed wheel of larger diameter is fixed to a different imbalance and engaged with a toothed wheel of smaller diameter, and wherein each toothed wheel of smaller diameter is fixed to one end of a drive shaft of a different motor;

each toothed wheel of smaller diameter comprises an externally toothed wheel fixed to one end of a drive shaft of a different motor, while the larger diameter toothed wheels of two reduction gears comprise two wheels with external toothing, two internal ring gears, or an externally-toothed wheel, and a crown with internal toothing;

one of the support arms of the first imbalance is fixed to a first toothed wheel of larger diameter, while the other support arm of the first imbalance is fixed to a collar rotatably mounted on the shaft frame via a bearing, wherein the support arm of the second imbalance is fixed to a second toothed wheel of larger diameter;

the motor comprises a through shaft each end of which engages with one of the first and second imbalances by means of the gear system, wherein the gear system comprises two reduction gears each comprising two toothed wheels of different diameters, wherein the toothed wheels of smaller diameter are each fixed to one end of the motor shaft and wherein each engages with one of the two toothed wheels of larger diameter, wherein the latter are also respectively engaged with a different imbalance;

one of the support arms of the first imbalance is fixed to a first toothed wheel of larger diameter, while the other support arm of the first imbalance is fixed to a collar rotatably mounted on the shaft, wherein a bearing and the support arm of the second imbalance is fixed to a second gear of larger diameter;

toothed wheels of smaller diameter of the reduction gears comprise externally-toothed wheels, while the larger diameter toothed wheels comprise an outer toothed wheel and an inner toothed ring gear;

one of the support arms of the first imbalance is fixed to the outer toothed wheel, while the other support arm of the first imbalance is fixed to a collar rotatably mounted on the shaft frame via a bearing, and wherein the support arm of the second imbalance is fixed to the inner toothed ring gear;

one of the support arms of the first imbalance is fixed to the inner toothed ring gear, while the other support arm of the first imbalance is fixed to a collar rotatably mounted on the shaft frame via a bearing, and wherein the support arm of the second imbalance is fixed to the outer toothed wheel;

the shaft frame comprises a first support arm of a first bearing, known as the first support arm, arranged radially with respect to the longitudinal axis of the shaft frame, wherein a mechanical coupling shaft is rotatably supported by the first arm for coupling the gear system in such a way that the first and second imbalances are counter-rotating in use;

the motor has a shaft end engaged with one of the first and second imbalances via the gear system, wherein the gear system comprises:
a first reduction gear comprising two toothed wheels of different diameters, wherein the toothed wheel of smaller diameter is fixed, on the one hand, to the end of the shaft of the motor and, on the other hand, meshes with the toothed wheel with a larger diameter, wherein the latter is fixed to the first or the second imbalance;
a second reduction gear comprising two toothed wheels of different diameters, wherein the toothed wheel of larger diameter is fixed to the other imbalance,
a first end of the coupling axle is fixed to the smaller diameter toothed wheel of the second reduction gear which meshes with the larger diameter toothed wheel of the second reduction gear, a second end of the coupling axle is attached to a toothed wheel meshed with the larger diameter toothed wheel of the first reduction gear so that the imbalances are mechanically coupled and mounted counter-rotatably relative to one another;

the shaft frame comprises at least three support plates of a motor arranged radially with respect to the longitudinal axis of the shaft frame and there are as many motors as support plates, wherein each is supported by a support plate and wherein each engages with one of the first and second imbalances via the gear system, wherein at least a first and a second motor are engaged with one of the first or second imbalances, and wherein at least one third motor is engaged with the other of the first or second imbalances;

wherein the gear system comprises:
a first and a second reduction gear each comprise two toothed wheels of different diameters, wherein the toothed wheels of smaller diameter are fixed, on the one hand, to the end of the shaft of the first and second motors and, on the other hand, mesh with the larger diameter toothed wheels, wherein the latter are fixed to the first or the second imbalance;
a third reduction gear comprising two toothed wheels of different diameters, wherein the toothed wheel of smaller diameter is fixed, on the one hand, to the end of the shaft of the third motor and, on the other hand, meshes with the toothed wheel of larger diameter, wherein the latter is fixed to the other imbalance,
a fourth and a fifth reduction gear, each comprising two toothed wheels of different diameters,
wherein a first end of the coupling axle engages via the fourth reduction gear with one of the first and second imbalances,
wherein a second end of the coupling axle engages with the other of the first and second imbalances via the fifth reduction gear, so that the imbalances are mechanically coupled and counter-rotatably mounted with respect to the other;

the shaft frame further comprises a second support arm of a second bearing, referred to as a second support arm, arranged radially with respect to the longitudinal axis of the shaft frame in such a way that the first and the second bearing are coaxially aligned and the mechanical coupling axle is rotatably supported by the two bearings;

the toothed wheels of smaller diameters of the reduction gear comprise externally-toothed wheels, while the larger diameter toothed wheels comprise an outer toothed wheel and an inner toothed wheel;

one of the support arms of the first imbalance is fixed to the outer toothed wheel, while the other support arm of the first imbalance is fixed to a collar rotatably mounted on the shaft frame via a bearing, and the support arm of the second imbalance is fixed to the inner toothed ring gear;

one of the support arms of the first imbalance is fixed to the inner toothed ring, while the other support arm of the first imbalance is fixed to a collar rotatably mounted on the shaft frame via a bearing, and the support arm of the second imbalance is fixed to the outer toothed wheel;

an electrical supply circuit for the at least one motor extends partly inside the shaft frame, while the other part extends from the shaft frame through at least one transverse opening to the motor(s).

More precisely, the present invention aims to provide a dynamic imbalanced force generator having, in addition, an increased stiffness, and which allows versatile use, i.e. it may be coupled vertically or horizontally to a second generator of imbalanced dynamic imbalanced forces according to the invention, in order, finally, to form a variable dynamic imbalanced force generator, namely an actuator.

This is why the invention also proposes an actuator comprising two generators according to the invention, wherein the generators are arranged in the operational position next to one another, while the two shaft frames are parallel to one another and are coupled electronically.

This is why the invention also proposes an actuator comprising two generators according to the invention, wherein the generators are arranged in an operational position, one above the other, while the two shaft frames are parallel to one another and coupled mechanically.

The invention may find an application for counteracting vibrations in various fields, including rotary-wing aircraft (helicopters in particular) and machines designed for making paper or concrete blocks and, more generally, machine tools.

DESCRIPTION OF THE DRAWINGS

The foregoing aspects and many of the attendant advantages of this invention will become more readily appreciated as the same become better understood by reference to the following detailed description, when taken in conjunction with the accompanying drawings, wherein:

Other features of the invention will emerge from the following detailed description made with reference to the accompanying drawings:

FIG. 1 shows a schematic sectional view of a dynamic imbalanced force generator according to the invention comprising a pair of eccentric mass imbalances and a single drive motor for the two imbalances;

FIG. 2 shows a schematic cross-sectional view of a dynamic imbalanced force generator according to the invention comprising a pair of imbalances and a single driving motor for one of the two imbalances, wherein the second imbalance engages in a counter-rotating manner with the first imbalance via a mechanical coupling axle;

FIG. 3 shows a schematic sectional view of a dynamic imbalanced force generator according to the invention comprising a pair of imbalances and a drive motor dedicated to each imbalance;

FIG. 4 shows a schematic cross-sectional view of a dynamic imbalanced force generator according to the invention, comprising a pair of imbalances, two drive motors for a first imbalance, a drive motor for the second imbalance and an axle for mechanical coupling of the two imbalances;

FIG. 5 shows a schematic cross-sectional view of a dynamic imbalanced force generator according to the invention comprising two imbalance pairs, corresponding more precisely to the association of two dynamic imbalanced force generators as shown in FIG. 1;

FIGS. 19a and 19b, show schematic perspective views comparing a dynamic imbalanced force generator according to the prior art, and a dynamic imbalanced force generator according to the invention;

FIG. 20 shows a schematic perspective view of an actuator or generator of variable dynamic imbalanced forces according to the prior art as a reference;

FIGS. 21a and 21b show schematic views in perspective of two possible arrangements of an actuator or generator of variable dynamic imbalanced forces according to the prior art;

FIGS. 22a and 22b show schematic views in perspective of an actuator or generator of variable dynamic imbalanced forces according to the invention and according to two possible arrangements; and FIG. 23 shows a graph showing the evolution of the amplitude of the dynamic imbalanced force (ratio of the force to mass of an actuator according to the invention with respect to the value of the force to mass ratio of a reference actuator) as a function of the mass value of the imbalances of the actuators according to the invention (angle of the masses), for various possible geometries.

DETAILED DESCRIPTION

Figure 6:
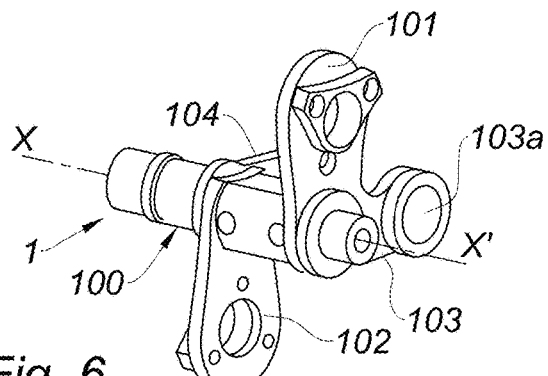
FIGS. 6 to 15 show schematic views in perspective of an exemplary embodiment of a dynamic imbalanced force generator according to the invention comprising a pair of imbalances, a motor for each imbalance and a mechanical coupling axle for the two imbalances.

According to the one representative embodiment, the dynamic imbalanced force generator 1 illustrated in FIGS. 1 to 5 comprises a shaft frame 10 with a longitudinal axis X-X'. It also comprises, one or more support plates 11, 12, 13 of a motor M1, M2, M3 arranged transversely to the longitudinal axis of the shaft frame; and a gear system 20, 21 described in detail hereinafter.

The shaft frame 10 also carries:

a first imbalance B1 comprising a mass 200 that is eccentric with respect to the shaft frame 10 and rotatably connected to the shaft frame by two arms 201, 202, of which one arm 201 is fixed to the gear system 20, while the other 202 is fixed to a ring 130 mounted rotatably on a bearing 105 fixed to the shaft frame 10 by means of a bearing 130;

a second imbalance B2 comprising a mass 300 that is eccentric with respect to the shaft frame 10 and connected rotatably to the shaft frame by an arm 301, wherein this arm 301 is moreover fixed to the gear system 21.

The second imbalance B2 is arranged between the first imbalance B1 and the shaft frame 10, coaxially with respect to the first imbalance B 1.

The one or more plates (11, 12, 13) support one (FIGS. 1, 2 and 5) or more (FIGS. 3 and 4) motors in engagement with at least one of the first and second imbalances via the gear system 20, 21.

The support plate(s) and the motor(s) are arranged between the imbalances B1-B2 and the shaft frame 10, and between the arm 201 of the first imbalance B1 and an arm of the second imbalance B2.

This arrangement makes it possible to limit the size of the dynamic imbalanced force generator.

The gear system 20, 21 makes it possible to connect a motor to the arms 201, 301. The gear system comprises at least two reduction gears 2a and 21 (at least one per imbalance), wherein each comprises two toothed wheels of different diameters, one toothed wheel of a larger diameter being fixed to a different imbalance and meshing with a smaller diameter toothed wheel.

In a first variant, each toothed wheel of smaller diameter is fixed to one end of a drive shaft of a motor (FIGS. 1, 3 and 4).

In a second variant, a first toothed wheel of smaller diameter is fixed to a drive shaft of a motor, and a toothed wheel of smaller diameter is fixed to one end of the rotary coupling shaft (FIG. 2).

The gear system may further comprise at least one additional reduction gear comprising two toothed wheels of different diameters, one of larger diameter and one of smaller diameter, wherein the toothed wheel of larger diameter is fixed to one of the imbalances. This toothed wheel of larger diameter may be either separate from the larger diameter toothed wheel of the other reduction gear engaged with the imbalance, or it may mesh with this toothed wheel. In the latter case, the two reduction gears together have only three toothed wheels: a common toothed wheel with a larger diameter fixed to the imbalance concerned, and two smaller diameter toothed wheels, at least one of which is fixed to a drive shaft of a motor, while the other may be fixed to one end of the rotary coupling shaft (FIG. 4).

In a particular embodiment of the invention, the shaft frame further comprises at least one first support arm of a first bearing, called a "bearing arm" 40 arranged radially (transversely) with respect to the axis longitudinal X-X' of the shaft frame 10.

Unlike the generator of document EP 0 409 462, the nested imbalanced pairs according to the invention are advantageously dissociated and positioned one on top of the other (FIG. 22a: the position allowing the mechanical coupling and the driving of the two imbalances by a single motor), or next to each other.

This gives the invention a greater implementation flexibility making it possible to respond all the more advantageously to the allocated volumes close to a section L/1=2 (see FIG. 23), whether this section is wider horizontally or vertically, and without calling into question the mechanical architecture of the dynamic imbalanced force generator (only the control needs to be adapted). The architecture according to the invention makes it possible, in particular, to produce a mechanically-coupled actuator with minimum footprint by virtue of the superimposed positioning of the two nested pairs (see FIGS. 5 and 18).

The advantage of the invention lies in the implementation of a motorization that is reduced in residual volume, further allowing:

a central fixed axle (the shaft frame 10) which may be dimensioned and used to support all the mechanical stresses, wherein the crankcase is then merely a physical barrier against the intrusion of dust or other products, or to prevent an object from being inserted into the generator during operation, or to contain the imbalance in the event of failure with mechanical disengagement of the latter;

simple implementation of an elementary type of reduction stage (with internal or external meshing and parallel axes), allowing mechanical coupling and counter rotation;

optimization of the force/mass ratio for allocated volumes with square or non-square cross-section, ideally with a ratio L/1=2.

In the embodiment of FIG. 1, the motor M1 comprises a through shaft 30, each end 30a-30b of which engages one of the first and second imbalances B1, B2 via the gear system 20, 21 and the arms 201, 301.

The gear system comprises two reduction gears 20, 21 each comprising two toothed wheels of different diameters, one of larger diameter 20a, 21a and one of smaller diameter 20b, 21b. The two smaller gears 20b, 21b are each secured to one end 30a, 30b of the through shaft 30 of the motor M1, while each meshes with one of the two toothed wheels of larger diameter 20a, 21a. These latter are also respectively fixed to a different imbalance B1, B2.

In other words, one of the larger diameter gears meshes with the first imbalance, while the other of the larger diameter gears meshes with the second imbalance. It should be pointed out that the larger diameter toothed wheel 20a is externally toothed. The counter-rotation of the two imbalances is ensured by the choice of the same reduction ratio of the reduction gears 20, 21.

According to another embodiment illustrated in FIG. 2, the shaft frame 10 comprises a first support arm of a first bearing, called the "first bearing arm" 40, arranged radially with respect to the longitudinal axis X-X' of the shaft frame.

The motor M1 comprises a non-through shaft 31 having an end 31a meshing with the first imbalance B1 and also meshing with the second imbalance B2 via the gear system 20.

The gear system comprises:
a mechanical coupling axle 41 rotatably mounted on the first bearing arm 40, wherein this axle 41 is arranged perpendicularly to the plane of rotation of the imbalances, i.e. parallel to the longitudinal axis X-X' of the shaft frame and mechanically coupling the first and second imbalances in a counter-rotating manner; and
three reduction gears 20, 22, 22' each comprising two toothed wheels of different diameters:
a first reduction gear 20 coupling the shaft 31 of the motor M1 with one of the first or second imbalances (in FIG. 2, this is the first imbalance B1);
two other reduction gears 22, 22' coupling the mechanical coupling axle 41 with the other of the first or second imbalances (in FIG. 2, this is the second imbalance B2).

More particularly, the motor M1 supported by the support plate 11 meshes with the first and second imbalances B1, B2 via the gear system. In this embodiment, the motor is engaged with the first imbalance via the reduction gear 20 and is engaged with the second imbalance B2 via the first imbalance B1, i.e. the second imbalance B2 is rotationally driven by mechanical coupling with the first imbalance, itself being driven by the motor (the engagement of the second imbalance with the motor may be described as indirect).

To this end, the gear system comprises not only three reduction gears 20, 22, 22' but also a rotary axle 41 to couple the two imbalances B1, B2 to each other.

More specifically, the gear system comprises:
- a first reduction gear 20 comprising two toothed wheels of different diameters, one of larger diameter 20a and one of smaller diameter 20b, wherein the smaller diameter toothed wheel 20b is fixed, on the one hand, to the end 31a of the shaft 31 of the motor M1 while, on the other hand, meshing with the larger diameter toothed wheel 20a, wherein the latter is fixed to the first or the second imbalance (in FIG. 2, this is the first imbalance B1);
- a mechanical coupling axle 41 rotatably mounted on the first bearing arm 40,
    - a first end 41a of the coupling axle 41 is meshed, via a second reduction gear 22' with the larger diameter toothed wheel 20a of the first reduction gear 20 (fixed to the first imbalance in FIG. 2),
    - a second end 41b of the coupling axle 41 is meshed with the other of the first and second imbalances (in FIG. 2, this is the second imbalance), via a third reduction gear 22, so that the imbalances are mechanically coupled and mounted counter-rotatably relative to one another.

Each reduction gear 22, 22' is made up of two toothed wheels of different diameters, one of larger diameter 22a, 22'a, and one of smaller diameter 22b, 22'b, wherein the smaller diameter toothed wheel 22b, 22' is, on the one hand, fixed at one end 41b, 41a to the coupling axle 41, while, on the other hand, meshing with the larger diameter toothed wheel 22a, 22'a, wherein the toothed wheel 22a is fixed to the other of the first and second imbalances (in FIG. 2, this is the second imbalance), while the toothed wheel 22'a is fixed to the larger diameter toothed wheel 20a of the first reduction gear 20. The toothed wheel 22a has inner toothing, while the toothed wheel 20a of larger diameter, has externally toothing.

The counter-rotation of the first and second imbalances is also ensured by the choice of the same reduction ratio of the reduction gears 20, 22, 22'.

Optionally, the shaft frame 10 further comprises a second support arm of a second bearing, called the "second bearing arm", arranged radially with respect to the longitudinal axis of the shaft frame in such a way that the first and second bearings are aligned coaxially, while the rotatably-mounted axle is supported by the two bearings. This makes it possible to maintain parallelism between the mechanical coupling axle 41 and the axis X-X' of the shaft frame 10.

In the embodiment of FIG. 3, the shaft frame comprises two motors M1, M2, one for each imbalance B1, B2.

More precisely, apart from the imbalances identical to those of the previous embodiments, the shaft frame comprises:
- two support plates 11, 12 to support a motor arranged transversely with respect to the longitudinal axis of the shaft frame,
- a first motor M1 and a second motor M2 each supported by a support plate 11, 12 and each engaging with only one of the first and second imbalances by means of the gear system.

The gear system comprises:
- a first reduction gear 20 comprising two toothed wheels of different diameters, one of larger diameter 20a and one of smaller diameter 20b, wherein the toothed wheel of smaller diameter is fixed, on the one hand, to the end 31a of the shaft 31 of the first motor M1, while, on the other hand, meshing with the toothed wheel of larger diameter, wherein the latter is fixed to the first or the second imbalance (in FIG. 3, this is the first imbalance);
- a second reduction gear 23 comprising two toothed wheels of different diameters, one of larger diameter 23a and one of smaller diameter 23b, wherein the toothed wheel of smaller diameter is fixed, on the one hand, to the end 32a of the shaft 32 of the second motor M2, while, on the other hand, meshing with the toothed wheel of larger diameter, wherein the latter is fixed to the other imbalance (in FIG. 3, this is the second imbalance).

The counter-rotation of the imbalances is then managed electronically by sensors, preferably at least one sensor for the angular position of an imbalance for each imbalance, and a control unit (not shown). In other words, the imbalances B1, B2 are electronically coupled when the shaft frame 10 does not have a mechanical coupling axle. In this configuration, the imbalances are therefore mechanically independent.

FIG. 4 illustrates the possibility of providing multiple motors per imbalance, wherein the number of motors is defined according to the overall performance specified for the generator, the available space, and the performances of the motors in question.

In FIG. 4, apart from the imbalances identical to the previous embodiments, the shaft frame comprises:
- three support plates 11, 12, 13 to support a motor arranged transversely (radially) with respect to the longitudinal axis of the shaft frame;
- a first bearing arm 40, arranged transversely (i.e. radially) with respect to the longitudinal axis of the shaft frame;
- a first motor M1, a second motor M2 and a third motor M3 each supported by a support plate 11, 12, 13 and each meshing with one of the first and second imbalances via the gear system. The first motor M1 and the third motor M3 are in engagement with the first imbalance B1, while the second motor M2 is in engagement with the second imbalance B2.

Alternatively, it is the second imbalance that may be engaged with two motors, and the first imbalance with a single motor. Equally alternatively, each imbalance may be driven by two or more motors, depending on the size of each motor and the resulting extra weight, wherein the support plates and the motors are arranged between the imbalances and the shaft frame and between an arm of the first imbalance and the arm of the second imbalance.

The gear system comprises:
- a first reduction gear 20 comprising two toothed wheels of different diameters, one of larger diameter 20a and one of smaller diameter 20b, wherein the toothed wheel of smaller diameter is fixed, on the one hand, to the end 31a of the shaft 31 of the first motor M1, while, on the other hand, meshing with the toothed wheel of larger diameter, wherein the latter is fixed to the first or the second imbalance (in FIG. 4, this is the first imbalance B1);
- a second reduction gear 23 comprising two toothed wheels of different diameters, one of larger diameter 23a and one of smaller diameter 23b, wherein the toothed wheel of smaller diameter is fixed, on the one hand, to the end 32a of the shaft 32 of the second motor M2, while, on the other hand, meshing with the larger diameter toothed wheel, wherein the latter is fixed to the other imbalance (in FIG. 4, this is the second imbalance B2).

a third reduction gear 20' comprising two toothed wheels of different diameters, one of larger diameter 20'a and one of smaller diameter 20'b, wherein the toothed wheel of smaller diameter is fixed, on the one hand, to the end 33a of the shaft 33 of the third motor M3, while, on the other hand, meshing with the larger diameter toothed wheel, wherein the latter is fixed to the first or the second imbalance (in FIG. 4, this is the first imbalance B1).

a coupling axle 41 rotatably mounted on the first bearing arm 40 and mechanically coupling the first and second imbalances in a counter-rotating manner.

In FIG. 4, the following characteristics are illustrated:

a first end 41a of the coupling axle 41 is engaged with one of the first and second imbalances (in FIG. 4, this is the first imbalance), via a fourth reduction gear 22' to the larger diameter toothed wheel of the third reduction gear (fixed to the first imbalance in FIG. 4), a second end 41b of the coupling axle 41 is engaged with the other of the first and second imbalances (in FIG. 4, this is the second imbalance), via a fifth reduction gear 22, so that the imbalances are mechanically coupled and mounted counter-rotatably relative to one another.

The third reduction gear 22' comprises two toothed wheels of different diameters, one of larger diameter 22'a and one of smaller diameter 22'b, wherein the smaller diameter toothed wheel 22'b is, on the one hand, fixed to the first end 41a of the coupling axle 41 while, on the other hand, meshing with the larger diameter toothed wheel 22'a, wherein the latter is fixed to the first or the second imbalance (in FIG. 4, this is the first imbalance B1).

The fourth reduction gear 22 comprises two toothed wheels of different diameters, one with a larger diameter 22a and one with a smaller diameter 22b, wherein the smaller diameter toothed wheel 22b is fixed, on the one hand, to the second end 41b of the coupling axle 41, while, on the other hand, meshing with the larger diameter gearwheel 22a, wherein the latter is fixed to the first or the second toothed wheel (in FIG. 4, this is the second imbalance B2).

Optionally, the shaft frame 10 further comprises a second support arm of a second bearing, referred to as the "second bearing arm", arranged transversely (i.e. radially) with respect to the longitudinal axis X-X' of the shaft frame 10 in such a way that the first bearing and the second bearing are coaxially aligned, and wherein the rotatably-mounted shaft is supported by the two bearings, thus ensuring better maintenance of parallelism between the mechanical coupling axle 41 and the longitudinal axis X-X' of the shaft.

Thanks to the mechanical coupling of the two imbalances by the mechanical coupling axle, it is possible to provide several drive motors per imbalance, since it is the coupling axis which determines the synchronization of the imbalances.

The particular structure of the dynamic imbalanced force generator according to the invention allows a vertical coupling (FIGS. 5 and 18) or horizontal coupling (FIGS. 16 to 18) with two identical sub-parts to generate the dynamic imbalanced force generator.

In general, the toothed wheels of the reduction gears with smaller diameters are in the form of wheels with external toothing.

When the two imbalances B1 and B2 are mechanically coupled by a rotary coupling axle 41, the larger diameter toothed wheels of two reduction gears integral with different imbalances comprise an external toothed wheel and a ring with internal toothing. This permits counter-rotating drive of the imbalances by the mechanical coupling axle 41. Moreover, identical reduction ratios make it possible to obtain the counter-rotation at the same (absolute) rotation speed.

For example, one of the support arms of the first imbalance is attached to the external toothed wheel, while the other support arm of the first imbalance is fixed to a collar rotatably-mounted on the shaft mounted by means of a bearing. The support arm of the second imbalance is fixed to the toothed ring gear.

Alternatively, one of the support arms of the first imbalance is attached to the inner ring gear, while the other support arm of the first imbalance is attached to the collar. The support arm of the second imbalance is fixed to the external gear.

In this way, it is ensured that a mechanical coupling between the two imbalances (by a motor with a through shaft, FIGS. 1-5, or by a coupling axle mounted rotatably on one or two support arms, FIGS. 2-4) generates a counter-rotation of the imbalances.

When the imbalances are not mechanically but electronically coupled (FIG. 3), the type of larger diameter toothed wheels of two reduction gears integral with different imbalances is not important: they may comprise two wheels with external toothing, by two toothed ring gears, or by an externally toothed wheel and a ring gear with internal toothing. What matters is the direction of rotation imposed by the control unit on each of the motors, which makes it possible to ensure the desired counter-rotation.

FIGS. 6 to 15 illustrate an embodiment of a dynamic imbalanced force generator according to the invention. This is an example of an embodiment comprising a mechanical coupling axle between imbalances, in accordance with FIG. 4, but a motor per imbalance according to FIG. 3.

In FIG. 6, a shaft frame 100 carries two support plates 101 and 102 respectively intended to support a motor (not shown in FIG. 6). The plates 101 and 102 are arranged transversely with respect to the longitudinal axis X-X' of the shaft frame 100. The latter also comprises a first support arm 103 of a first bearing 103a (see FIG. 8), called the first bearing arm 103 and a second support arm 104 of a second bearing 104a, called the second bearing arm 104. The two bearing arms are arranged transversely with respect to the longitudinal axis X-X' of the shaft frame 100.

Figure 7:
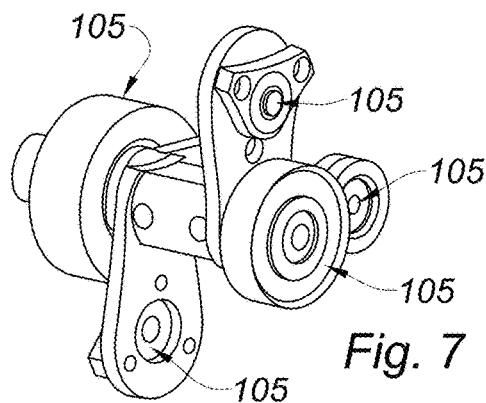

FIG. 7 illustrates various bearings 105 fixed on the shaft frame 100 and intended to be mounted in a rotatable manner with respect to this shaft frame 100, the parts of which will be fixed to these bearings 105.

Figure 8:
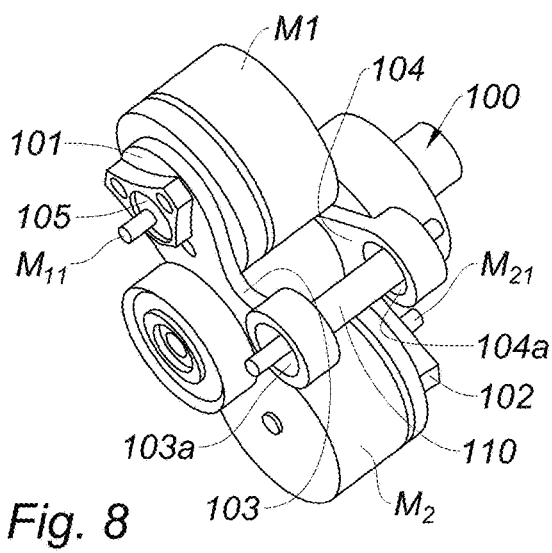

As shown in FIG. 8, two motors M1 and M2 are fixed on the plates 101 and 102. Each motor M1 and M2 comprises a shaft M11 and M21, possibly supported by a bearing 105 carried by a bearing provided in each support plate 101 and 102. It should be noted that the presence of the bearing 105 here is sometimes not obligatory, in particular when the internal guiding of the motor (which provides a pair of bearings) is sufficient to absorb the radial, and sometimes axial, stresses transmitted by the toothed wheel connected to the motor shaft.

In addition, a mechanical coupling axle 110 of the imbalances is supported by the first bearing arm 103 and the second bearing arm 104 when rotating. To do this, the mechanical coupling axle 110 is fixed on two bearings 105 positioned inside the bearings 103a and 104a of the first and second bearing arms 103 and 104.

Figure 9:
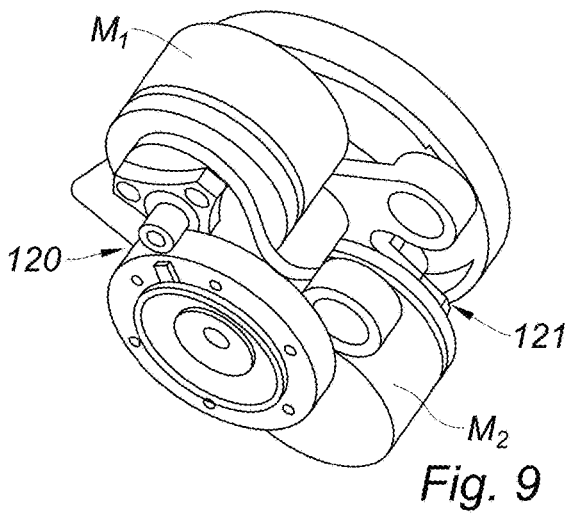

In FIG. 9, the mechanical coupling axle 110 has not been shown for the sake of clarity. In this figure, the shaft frame comprises two reduction gears 120 and 121 each comprising two toothed wheels of different diameters, namely a smaller diameter toothed wheel 120*a* and 121*a* and a larger diameter toothed wheel 120*b* and 121*b*.

The smaller diameter toothed wheels 120*a* and 121*a* are fastened to the shafts M11 and M21 of the motors M1 and M2. These smaller diameter toothed wheels 120*a* and 121*a* are formed by externally toothed wheels, while the larger diameter toothed wheels 120*b* and 121*b* comprise, respectively, an outer toothed wheel 120*b* and an inner toothed wheel 121*b*. Each toothed wheel of smaller diameter 120*a*, 121*a* meshes with a larger diameter toothed wheel 120*b* and 121*b*.

The mechanical coupling axle 110 comprises at each end an externally toothed wheel meshed, on the one hand, with the larger diameter toothed wheel 120*b* of the first reduction gear 120 and, on the other hand, with the larger diameter toothed wheel 121*b* of the second reduction gear 121. These two larger diameter toothed wheels 120*b* and 121*b* are, respectively, an externally toothed wheel and an internally toothed wheel, wherein the mechanical coupling axle 110 couples these two toothed wheels in such a way that they counter-rotate in operation.

Figure 10:
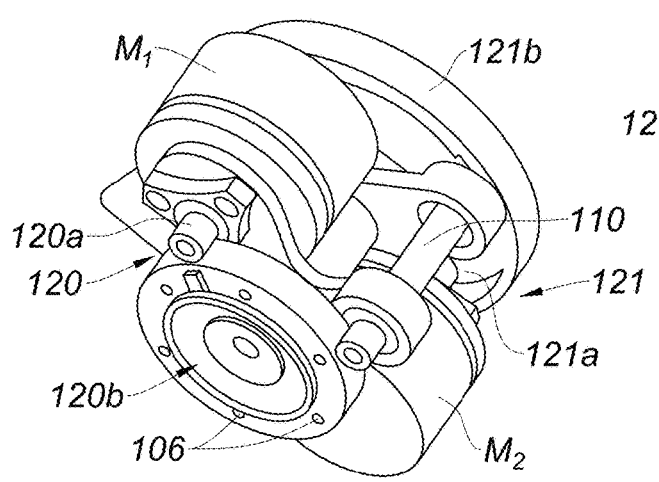
Figure 11:
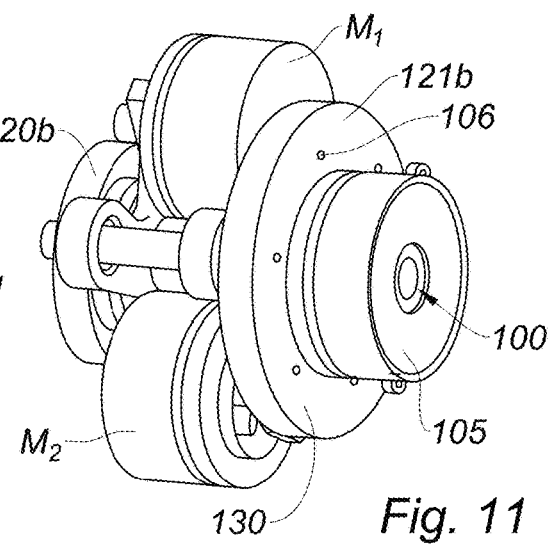

FIG. 11 illustrates an inverted view with respect to FIG. 10 to illustrate, moreover, the presence of a collar 130 mounted to rotate on the shaft frame 100 by means of a bearing 105.

Figure 12:
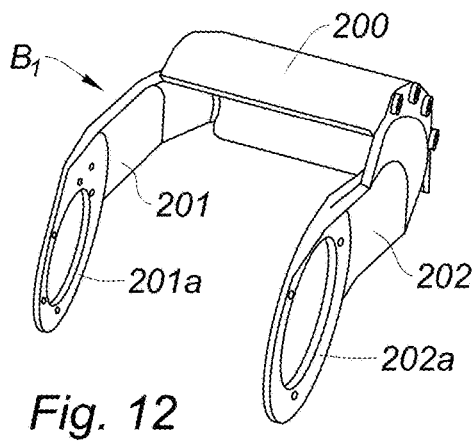
Figure 13:
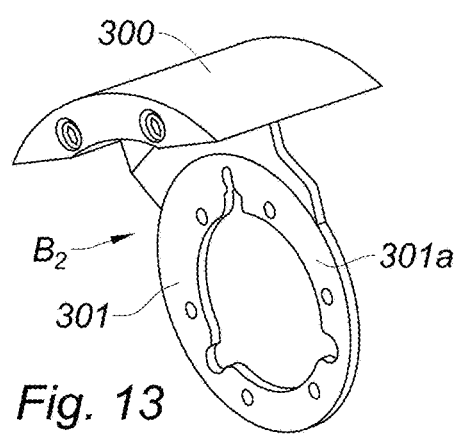

The toothed wheels of larger diameter 120*b* and 121*b*, as well as the collar 130, have means for fixing the imbalances B1 and B2 illustrated in FIGS. 12 and 13. These fixing means are holes 106 for the passage of bolts.

As shown in FIGS. 12 and 13, each imbalance comprises a mass fixed to at least one arm intended to be carried on the rotatably-mounted shaft.

In FIG. 12, the imbalance B1 comprises a mass 200 fixed to two arms 201 and 202, wherein each comprises a flange 201*a* and 202*a* for fastening to the gear system. The mass 200 has a convex outer face when in the position of use. It also has a concave inner face when in the position of use. This shape makes it possible both to minimize the size of the mass 200, as well as to allow the mass 300 of the imbalance B2 to be housed without friction. The latter comprises, attached to the mass 300, an arm 301 provided with a flange 301*a* for fastening to the gear system. The mass 300 has a convex outer face when in the position of use so that it may rotate without friction underneath the mass 200 of the imbalance B1.

Figure 14:
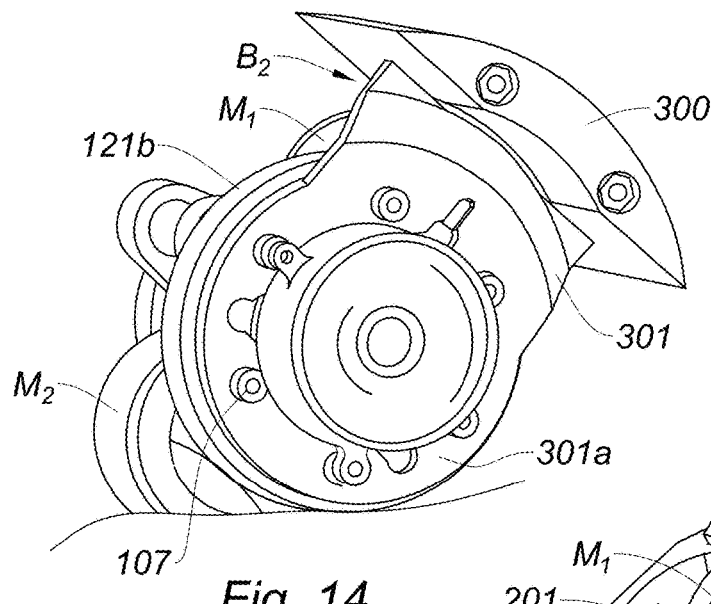

FIG. 14 shows the dynamic imbalanced force generator illustrated in FIGS. 6 to 11, and to which the imbalance B2 is fixed. More precisely, the flange 301*a* of the arm 301 is fixed to the larger diameter toothed wheel 121*b* of the reduction gear 121 by bolts 107 screwed into the threaded holes 106 in the larger diameter toothed wheel 121*b*. In this way the imbalance B2 is rotatably connected to the shaft frame 100 via the reduction gear 121 so that the mass 300 is eccentric with respect to the shaft frame.

Figure 15:
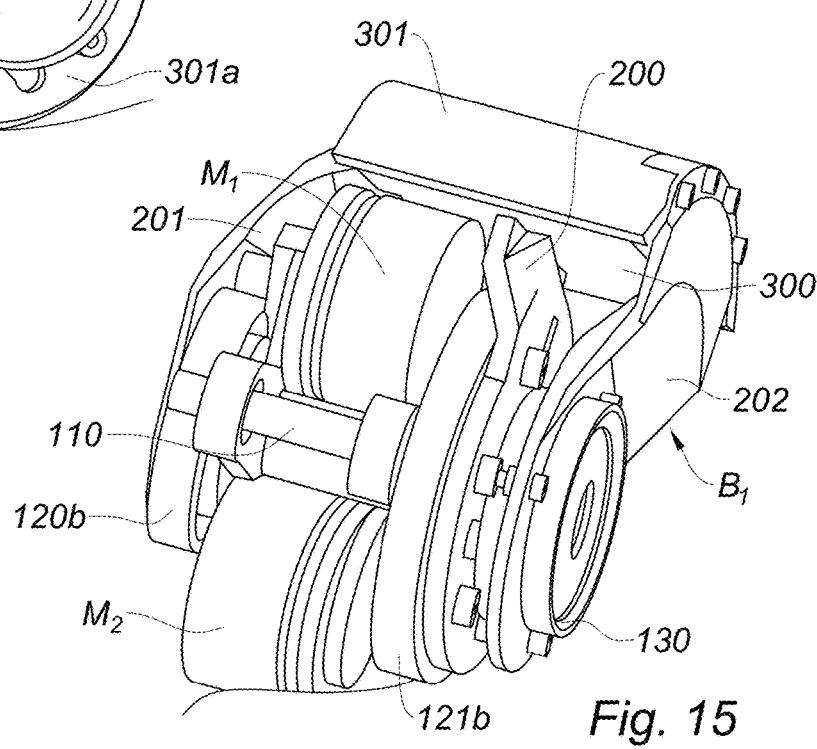

In FIG. 15, the dynamic imbalanced force generator of FIG. 14 further comprises the imbalance B1 rotatably fixed to the shaft frame 100.

More precisely, the support arm 201 is fixed to the larger diameter toothed wheel 120*b* of the first reduction gear 120. The other arm 202 of the imbalance B1 is fixed to the collar 130 that is rotatably mounted on the shaft frame 100 via bearing 105.

By virtue of this arrangement, the imbalance B1 is located above the imbalance B2 in the position of use, and has an eccentric mass with respect to the shaft frame. Furthermore, all the space between the masses 200 and 300 and the shaft frame 100 is used to house the motors, the gear system and the bearings.

Moreover, the mechanical coupling axle 110 mechanically links the larger diameter toothed wheels 120*b* and 121*b* so that the imbalances are counter-rotating in use.

Figure 16:
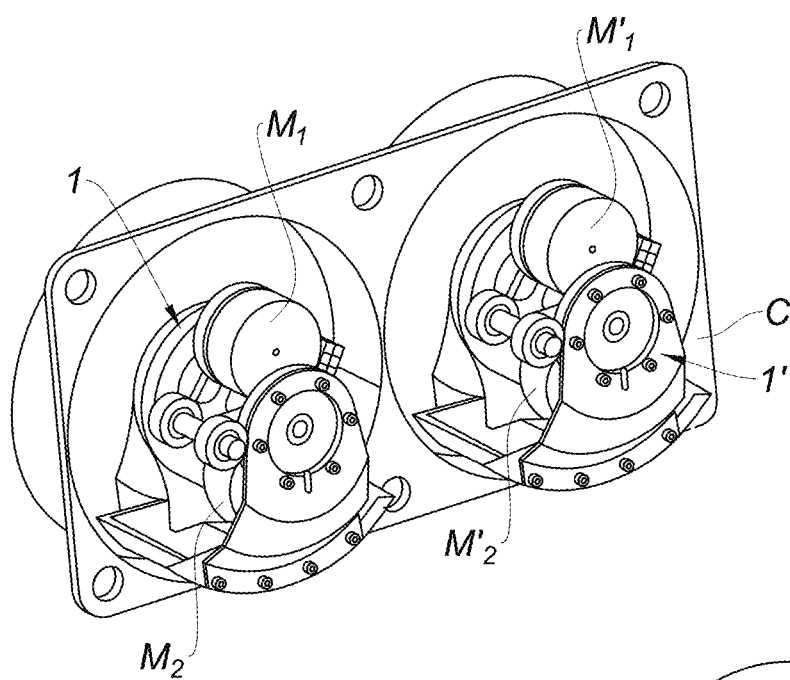
FIGS. 16 to 18 show schematic views in perspective of an actuator or generator of variable dynamic imbalanced forces according to the invention associating two pairs of imbalances, wherein a motor is provided for each imbalance, as well as a mechanical coupling axle of the two imbalances of the same pair, according to the diagrams of FIGS. 6 to 15.
Figure 17:
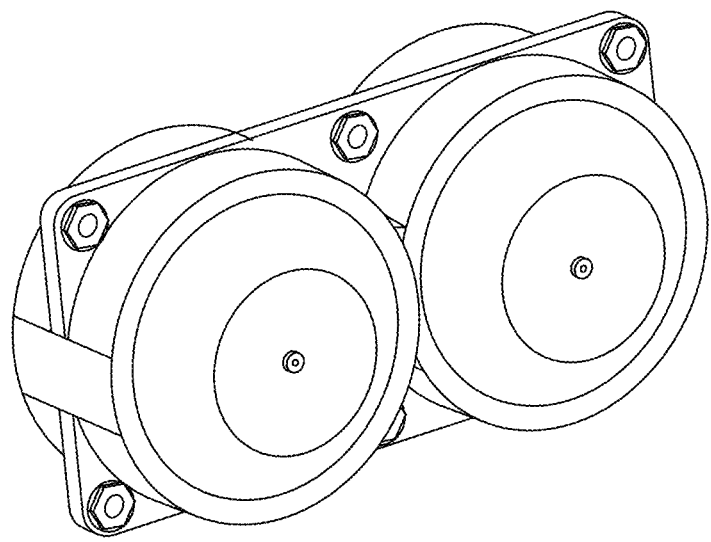

FIGS. 16 and 17 illustrate an embodiment of a variable dynamic imbalanced force generator (actuator) comprising two identical dynamic imbalanced force generators 1, 1', and so associated that their shaft frames are parallel. Each dynamic imbalanced force generator 1, 1' complies with a dynamic imbalanced force generator that has been described in support of FIGS. 6 to 15. Each dynamic imbalanced force generator 1, 1' is fixed to a protective housing C through its respective shaft frame. This protective housing serves for protection against dust, fluids or any external element which may hinder or damage the generators. Advantageously, the attachment of the actuator to its receiving structure is effected via each shaft frame 10, so that the mechanical stresses do not pass through the crankcase C. However, in FIGS. 16 and 17, a case is shown in which the actuator may be fixed on the receiving structure (presence of six holes on the crankcase for a fixing means), and is, therefore, subjected to mechanical stresses: this is generally penalizing in terms of weight, because the crankcase must be dimensioned accordingly.

Figure 18:
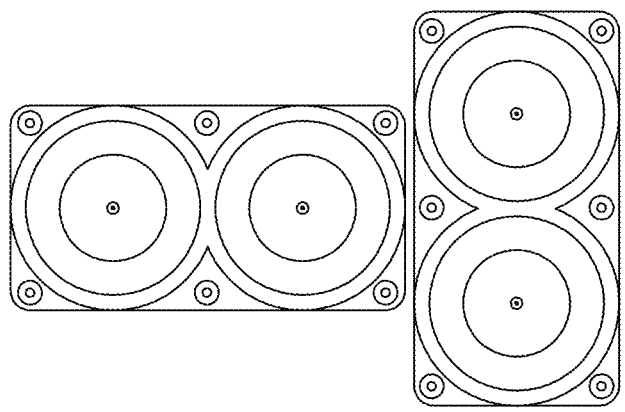

As may be seen in FIG. 18, a variable dynamic imbalanced force actuator or generator according to the invention may be arranged horizontally (the dynamic imbalanced force generators 1, 1' are then arranged side by side, or vertically (the dynamic imbalanced force generators 1, 1' are then arranged one above the other).

In the case where the nested imbalances of the same dynamic imbalanced force generator 1, 1' are positioned side by side (horizontally), it is preferable that imbalances of the same pair (i.e. within module 1, or of the module 1') are rotated in the same direction (co-rotation). The imbalances of the dynamic imbalanced force generator 1 are however driven in a counter-rotating direction relative to the direction of rotation of the imbalances of the module 1'. This mode of operation makes it possible to avoid the generation of a parasitic torque between the two modules 1, 1'.

Advantageously, the dynamic imbalanced force generators 1, 1' are arranged one above the other (vertically). In this case, imbalances of the same pair (within the same module 1, 1') may be driven in counter-rotation, without generating a parasitic torque between the two modules 1, 1'. Consequently, this allows the mechanical coupling and the driving of the two imbalances by a single motor within the same pair.

This gives the invention a greater implementation flexibility making it possible to respond all the more advantageously to the allotted volumes close to a section L/1=2 (see FIG. 23, where L is the length and l the width), whether this section is wider horizontally or vertically, and without calling into question the mechanical architecture of the dynamic imbalanced force generator (only the control needs to be adapted: electronic or not).

By positioning the imbalances in a dynamic imbalanced force generator 1, 1' given in accordance with the invention, the latter generates no parasitic torque $M_P$ in contrast to the dynamic imbalanced force generator according to the prior art illustrated in FIG. 19*a* (document D3).

FIGS. 20 to 22*b* compare the size of a variable dynamic imbalanced force generator (actuator) of the prior art (FIGS.

20, 21a and 21b) with the variable dynamic imbalanced force generator (actuator) according to the invention (FIG. 22a, FIG. 22b).

Thus, FIG. 20 illustrates a generator of variable dynamic imbalanced force generator according to the document D2. In this document, a square footprint is obtained, each side of which is twice the diameter of only one of the four imbalances. The length of this side is denoted "L" in FIG. 20.

FIG. 21a illustrates a variable dynamic imbalanced force generator according to document D3. This generator has a rectangular size of length L, and width 1=L/2. Therefore, the overall width is less than that of the variable dynamic imbalanced force generator of FIG. 20. However, this arrangement has a double thickness H with respect to the variable dynamic imbalanced force generator of FIG. 20 and generates, in addition, parasitic torque $M_P$.

FIG. 21b illustrates the same variable dynamic imbalanced force generator of FIG. 21a, but in a vertical configuration, i.e. the pairs of imbalances are arranged one above the other. The same comments may be made with reference to FIG. 2a.

FIGS. 22a and 22b show the size of a variable dynamic imbalanced force generator (actuator) according to the invention. This space requirement is rectangular and has a length L, and a width 1=L/2. On this plane, the configurations of FIG. 21a or 21b are thus joined. However, unlike FIGS. 21a and 21b, the thickness is half less than in the generators of FIGS. 21a and 21b and joins that of FIG. 20. Furthermore, contrary to the designs of FIGS. 21a and 21b, there is no parasitic torque $M_P$.

The graph of FIG. 23 illustrates the comparison between a variable dynamic imbalanced force generator according to the invention and a reference, namely a variable dynamic imbalanced force generator according to FIG. 20 (actuator comprising four counter-rotating two-by-two and non-coaxial imbalances). More precisely, this graph represents the evolution of the ratio of the force to mass ratio of a variable dynamic imbalanced force generator according to the invention and the value of the force/mass ratio of the reference, as a function of the geometry of the variable imbalances according the invention. The force taken into account in this ratio is the maximum amplitude of the dynamic imbalanced force delivered by the variable dynamic imbalanced force generator.

The geometry of the imbalances of the variable dynamic imbalanced force generator according to the invention is represented by the value of the angle between the two ends of the mass of an imbalance, and passing through the axis of rotation of this imbalance. In other words, the more open the angle, the more important is the mass of imbalance, all other things being equal (thickness of mass, material of mass, etc.).

Since the variable dynamic imbalanced force generator according to the invention and the reference have different geometries, the calculations have been carried out in order to optimize the masses as a function of the compared geometries.

Thus, for a rectangular architecture such as L/1=2, a mass angle of 75° of the coaxial imbalances according to the invention makes it possible to obtain an amplitude of the dynamic imbalanced force that is four times greater with respect to the reference architecture, with identical imbalance mass.

Conversely, in order to obtain an amplitude of the dynamic imbalanced force equal to that of the reference, the architecture according to the invention uses an imbalance mass four times lower. Thus, with an equal amplitude, the mass of the antivibration system is decreased, which is a determining criterion in aeronautics.

The mass considered in this graph is that of the imbalances alone.

In this case, it is noted that the architecture according to the invention is of interest only for values of L/1 greater than 1, or 1.1. In fact, for a ratio L/1 equal to 1, the architecture according to the invention seems unfavorable because if the mass of imbalances increases (i.e. if the angle increases), the amplitude of the dynamic imbalanced force is lower with an architecture according to the invention compared to a reference architecture.

However, in reality, the mass of the crankcase is not negligible in this reasoning. Its contribution in the case of L/1=1 is also particularly favorable to the architecture according to the invention since, in the end, the volume of the crankcase is reduced by half (in detail A, it is seen that the dimensions of the crankcase may be reduced since the nested imbalances take up only half of the space). The advantage is all the more significant if, as this architecture with a fixed central axis according to the invention allows, the crankcase is eliminated, or if its mass is negligible. In the end, the ratio of force to mass will therefore be systematically to the advantage of the architecture according to the invention.

Advantageously, the shaft frame will be tubular, i.e. it will have an internal space. Moreover, such a tubular shaft frame is illustrated in the accompanying figures. By virtue of this, and thanks to the fact that the support structures (plates, bearings, bearing arms) are carried by the shaft frame, an electrical supply circuit for the motor(s) the other part may extend from the shaft constructed by at least one transverse opening to the motor(s).

According to other characteristics of the invention not shown:
  a variable dynamic imbalanced force generator according to the invention may by used in an aircraft in order to compensate for vibrations of the aircraft;
  a dynamic imbalanced force generator is advantageously driven by a control unit in response to a vibration signal received from sensors placed in the aircraft in an ad hoc manner.

Thanks to the dynamic imbalanced force generator according to the invention, the transmission of the force is no longer necessarily achieved by means of a crankcase capable of transmitting the dynamic imbalanced force, which thus lightens the assembly.

The motorization of imbalances via single-gear reduction gears (one with a larger diameter and one with a smaller diameter), as well as the eccentric arrangement of the, or each, motor, make the generator much less sensitive to dynamic disturbances. In fact, the interference torque created on the imbalance, and fed back to the drive shaft is reduced by a factor which is inversely proportional to the square of the reduction ratio of a reduction gear.

The mechanical coupling of the counter-rotating imbalances is obtained by an internal engagement in the volume of the two imbalances, which optimizes the volume and the mass used. In the invention, the motorization is positioned between the pair of coaxial imbalances, while the axle formed by the shaft frame, which allows mechanical coupling through an external toothed wheel and an internal toothed ring, or directly through a motor and a dedicated shaft. The associated sprockets and toothed wheels are of smaller diameter than the functional envelope of the imbalances, which allows a decrease in weight. In addition, the drive combines mechanical coupling and speed reduction while allowing imbalances to be nested in one another along the same axis, which virtually divides the occupied volume and eliminates any spurious torque effect.

The eccentric arrangement of the integrated motor between two nested imbalances allows a significant reduction in the "force"/"imbalance mass" ratio and a division by two of the "force"/"volume" ratio with respect to the imbalances with separate axial or unnested coaxial axes. The deviation of the ratio "force"/"imbalance mass" may range from 1 to 4 in favor of the invention for the same available volume, according to the geometry of the space dedicated to the system (see FIG. 23). This advantage comes from the fact that the coaxial arrangement allows for larger imbalanced diameters, and that the nesting of the imbalances allows division of the volume by two.

It should also be noted that, in the context of the invention, a dynamic imbalanced force generator such as that shown in FIGS. 1 to 15 (two imbalances) offers the modularity of creating a variable dynamic imbalanced force generator or actuator (2 times 2 imbalances, i.e. 4 imbalances), as illustrated in FIGS. 16 to 18, by arranging each dynamic imbalanced force generator on either side of a horizontal or vertical wall (or structure). According to the case, the coupling of the imbalances within the dynamic imbalanced force generators will be mechanical (vertical case) or electronic (horizontal case) in order to avoid any parasitic torque.

Finally, in stabilized mode (at the target rotation frequency), little energy is required to maintain the rotation, in contrast to the starting transient (in particular at low environmental temperature). The variable dynamic imbalanced force generator according to the invention, when it is equipped with at least two motors and where the synchronization is mechanical, makes it possible to deactivate a motor and to provide redundancy with this secondary motor in order to compensate for a failure of the main motor.

While illustrative embodiments have been illustrated and described, it will be appreciated that various changes can be made therein without departing from the spirit and scope of the invention.

The embodiments of the invention in which an exclusive property or privilege is claimed are defined as follows:

1. A dynamic imbalanced force generator, comprising:
   a shaft frame having a longitudinal axis and having:
   at least one support plate of a motor arranged radially with respect to the longitudinal axis of the shaft frame; and
   a gear system,
   wherein the shaft frame carries:
   a first imbalance comprising a mass eccentric with respect to the shaft frame and rotatably connected to the shaft frame formed by two arms of which one is fixed to the gear system;
   a second imbalance comprising a mass eccentric to the shaft frame and rotatably connected to the shaft frame by an arm attached to the gear system, wherein the second imbalance is arranged coaxially with the first imbalance between the first imbalance and the shaft frame; and
   at least one motor supported by the support plate and engaged with at least one of the first and second imbalances via the gear system, wherein the support plate and the motor are arranged between the imbalances and the shaft frame and between an arm of the first imbalance and an arm of the second imbalance.

2. The dynamic imbalanced force generator according to claim 1, wherein the shaft frame comprises:
   at least two motor support plates arranged radially with respect to the longitudinal axis of the shaft frame;
   wherein each of the motors is supported by a support plate and each of the motors is engaged with one of the first and second imbalances via the gear system, wherein at least one first motor is engaged with one of the first or second imbalances, and wherein at least one second motor is engaged with the other of the first or second imbalances.

3. The dynamic imbalanced force generator according to claim 2, wherein the shaft frame comprises:
   two motor support plates arranged radially with respect to the longitudinal axis of the shaft frame,
   wherein a first and second motor is respectively supported by a support plate and is engaged with only one of the first and second imbalances via the gear system;
   wherein the generator further comprises a control unit designed to control a counter-rotation of the first and second motors electronically.

4. The dynamic imbalanced force generator according to claim 3, wherein the gear system comprises two reduction gears each comprising two toothed wheels of different diameters, a toothed wheel of larger diameter and a toothed wheel of smaller diameter, wherein each larger diameter toothed wheel is fixed to a different imbalance and meshes with a smaller diameter toothed wheel, and wherein each smaller diameter toothed wheel is attached to one end of a drive shaft of a different motor.

5. The dynamic imbalance force generator according to claim 4, wherein each smaller-diameter toothed wheel comprises an externally-toothed wheel fixed to one end of a drive shaft of a different motor, while the larger diameter toothed wheels of two reduction gears comprise of two externally-toothed wheels, two inner-toothed rings, or an externally-toothed wheel and an internally-toothed ring.

6. The dynamic imbalanced force generator according to claim 3, wherein one of the support arms of the first imbalance is fastened to a larger first toothed wheel, while the other support arm of the first imbalance is secured to a collar rotatably-mounted on the shaft frame by means of a bearing, and the support arm of the second imbalance is fixed to a second toothed wheel of larger diameter.

7. The dynamic imbalanced force generator according to claim 1, wherein the motor comprises a traverse shaft, each end of which is engaged with one of the first and second imbalances via the gear system, wherein the gear system comprises two reduction gears each comprising two toothed wheels of different diameters, wherein the two smaller diameter toothed wheels are respectively fixed to one end of the motor shaft and respectively mesh with one of the two toothed wheels of larger diameter, wherein the latter are also respectively engaged with a different imbalance.

8. The dynamic imbalanced force generator according to claim 7, wherein one of the support arms of the first imbalance is fixed to a first toothed wheel of larger diameter, while the other support arm of the first imbalance is fastened to a collar which is rotatably mounted on the shaft by means of a bearing, and wherein the support arm of the second imbalance is fixed to a second toothed of larger diameter.

9. The dynamic imbalanced force generator according to claim 7, wherein the toothed wheels of smaller diameter of the reduction gears comprise wheels with external toothing, and wherein the toothed wheels of larger diameter comprises of an externally toothed wheel and an internally toothed ring gear.

10. The dynamic imbalanced force generator according to claim 9, wherein one of the support arms of the first imbalance is fixed to the externally toothed wheel, while the other support arm of the first imbalance is fixed to a collar mounted rotatably on the shaft formed by a bearing, while the support arm of the second imbalance is fixed to the internally toothed ring gear.

11. The dynamic imbalanced force generator according to claim 9, wherein one of the support arms of the first imbalance is fixed to the internally toothed ring gear, while the other support arm of the first imbalance is fixed to a collar mounted rotatably on the shaft formed by a bearing, and wherein the support arm of the second imbalance is fixed to the externally toothed wheel.

12. The dynamic imbalanced force generator according to claim 1, wherein the shaft frame comprises a first support arm of a first bearing, wherein the first bearing arm is arranged radially with respect to the longitudinal axis of the shaft frame, and wherein a mechanical coupling axle is rotatably supported by the first bearing arm for coupling the gear system so that the first and the second imbalance counter-rotate in use.

13. The dynamic imbalanced force generator according to claim 12, wherein the motor has a shaft end engaged with one of the first and second imbalances by means of the gear system, wherein the gear system comprises:
    a first reduction gear comprising two toothed wheels of different diameters, wherein the toothed wheel of smaller diameter is fixed, on the one hand, to the end of the motor shaft and, on the other hand, meshes with the larger-diameter toothed wheel, wherein the latter is fixed to the first or the second imbalance;
    a second reduction gear comprising two toothed wheels of different diameters, wherein the toothed wheel of larger diameter is fixed to the other imbalance,
    wherein a first end of the coupling axle is fixed to the smaller diameter toothed wheel of the second reduction gear which meshes with the larger diameter toothed wheel of the second reduction gear,
    wherein a second end of the coupling axle is fastened to a toothed wheel meshed with the larger diameter toothed wheel of the first reduction gear, so that the imbalances are mechanically coupled and mounted counter-rotatably relative to one another.

14. The dynamic imbalanced force generator according to claim 12, wherein the shaft frame comprises:
    at least three support plates to support a motor arranged radially with respect to the longitudinal axis of the shaft frame;
    as many motors as there are support plates, wherein each is supported by a support plate and each engages with one of the first and second imbalances via the gear system, wherein at least one first and one second motor is in engagement with one of the first or second imbalances, and wherein at least one third motor is in engagement with the other of the first or second imbalance.

15. The dynamic imbalanced force generator according to claim 14, wherein the gear system comprises:
    a first reduction gear and a second reduction gear, respectively comprising of two toothed wheels of different diameters, wherein the smaller diameter toothed wheel is fixed, on the one hand, to the end of the first and second shafts of the motors, while, on the other hand, meshing with the larger diameter toothed wheels, wherein the latter are fixed to the first or the second imbalance;
    a third reduction gear comprising two toothed wheels of different diameters, wherein the toothed wheel of smaller diameter is fixed, on the one hand, to the end of the shaft of the third motor, while, on the other hand, meshing with the toothed wheel of larger diameter, wherein the latter is fixed to the other imbalance,
    a fourth and a fifth reduction gear, each comprising two toothed wheels of different diameters,
    a first end of the coupling axle is meshed with one of the first and second imbalances via the fourth reduction gear,
    a second end of the coupling axle is engaged via the fifth reduction gear with the other end of the first and second imbalances, so that the imbalances are mechanically coupled and mounted counter-rotatably with respect to one another.

16. The dynamic imbalanced force generator according to claim 12, wherein the shaft further comprises a second support arm of a second bearing, wherein the second bearing arm is arranged radially with respect to the longitudinal axis of the shaft frame, so that the first and second bearings are coaxially aligned and the mechanical coupling axle is rotatably supported by the two bearings.

17. The dynamic imbalanced force generator according to claim 12, wherein the toothed wheels of smaller diameter of the reduction gears comprise externally toothed wheels and the toothed wheels of larger diameter comprise an externally toothed wheel and an internally toothed ring gear.

18. The dynamic imbalanced force generator according to claim 17, wherein one of the support arms of the first imbalance is fixed to the externally toothed wheel, while the other support arm of the first imbalance is fixed to a collar mounted rotatably on the shaft frame by means of a bearing, and wherein the support arm of the second imbalance is fixed to the internally toothed ring gear.

19. The dynamic imbalanced force generator according to claim 17, wherein one of the support arms of the first imbalance is fixed to the internally toothed ring gear, while the other support arm of the first imbalance is fixed to a collar mounted rotatably on the shaft frame by means of a bearing, and wherein the support arm of the second imbalance is fixed to the externally toothed wheel.

20. The dynamic imbalanced force generator according to claim 1, wherein an electrical circuit for supplying the at least one motor extends partly inside the shaft frame, while the other part exiting from the shaft frame extends through at least one transverse opening as far as the motor(s).

21. An actuator comprising two generators according to claim 1, in which the generators are arranged in a side-by-side arrangement, wherein the two shaft frames are parallel to one another and electronically coupled.

22. An actuator comprising two generators according to claim 1, wherein the generators are arranged one above the other in the operational position, wherein the two shaft frames are parallel to one another and mechanically coupled.

* * * * *

UNITED STATES PATENT AND TRADEMARK OFFICE
CERTIFICATE OF CORRECTION

Page 1 of 1

PATENT NO. : 10,625,302 B2
APPLICATION NO. : 15/789807
DATED : April 21, 2020
INVENTOR(S) : M. Six et al.

It is certified that error appears in the above-identified patent and that said Letters Patent is hereby corrected as shown below:

In the Claims

| Column | Line | |
|---|---|---|
| 18 | 59 | Claim 8: "toothed of" to -- toothed wheel of -- |

Signed and Sealed this
Twenty-second Day of June, 2021

Drew Hirshfeld
*Performing the Functions and Duties of the*
*Under Secretary of Commerce for Intellectual Property and*
*Director of the United States Patent and Trademark Office*